(12) United States Patent
Evulet

(10) Patent No.: US 11,053,012 B2
(45) Date of Patent: Jul. 6, 2021

(54) WINGLET EJECTOR CONFIGURATIONS

(71) Applicant: JETOPTERA, INC., Edmonds, WA (US)

(72) Inventor: Andrei Evulet, Edmonds, WA (US)

(73) Assignee: Jetoptera, Inc., Edmonds, WA (US)

( * ) Notice: Subject to any disclaimer, the term of this patent is extended or adjusted under 35 U.S.C. 154(b) by 0 days.

(21) Appl. No.: 16/786,894

(22) Filed: Feb. 10, 2020

(65) Prior Publication Data

US 2020/0339269 A1    Oct. 29, 2020

Related U.S. Application Data

(63) Continuation of application No. 15/625,907, filed on Jun. 16, 2017, now abandoned, which is a continuation-in-part of application No. 15/221,389, filed on Jul. 27, 2016, now Pat. No. 10,501,197.

(60) Provisional application No. 62/213,465, filed on Sep. 2, 2015.

(51) Int. Cl.

| | |
|---|---|
| *B64D 27/18* | (2006.01) |
| *B64D 29/02* | (2006.01) |
| *B64D 33/04* | (2006.01) |
| *B64C 39/02* | (2006.01) |
| *B64C 21/00* | (2006.01) |
| *B64D 33/02* | (2006.01) |
| *B64C 9/38* | (2006.01) |
| *B64C 15/00* | (2006.01) |
| *B64D 27/10* | (2006.01) |

(52) U.S. Cl.
CPC ........... *B64D 27/18* (2013.01); *B64C 9/38* (2013.01); *B64C 15/00* (2013.01); *B64C 21/00* (2013.01); *B64C 39/024* (2013.01); *B64D 27/10* (2013.01); *B64D 29/02* (2013.01); *B64D 33/02* (2013.01); *B64D 33/04* (2013.01); *B64C 2201/10* (2013.01); *B64C 2201/104* (2013.01); *B64D 2033/0273* (2013.01); *Y02T 50/10* (2013.01); *Y02T 50/30* (2013.01)

(58) Field of Classification Search
CPC ........ B64D 27/18; B64D 27/00; B64D 29/02; B64D 33/02; B64D 33/04; B64C 9/38; B64C 15/00; B64C 21/00; B64C 39/024
See application file for complete search history.

(56) References Cited

U.S. PATENT DOCUMENTS

| | | | | |
|---|---|---|---|---|
| 3,525,474 A | * | 8/1970 | Mills | F02K 1/36 239/265.17 |
| 3,795,367 A | * | 3/1974 | Mocarski | B05B 7/0416 239/265.17 |
| 3,834,834 A | * | 9/1974 | Quinn | F04F 5/466 417/179 |
| 3,926,373 A | * | 12/1975 | Viets | B64D 33/04 239/265.17 |
| 4,448,354 A | * | 5/1984 | Reznick | B64C 29/00 239/265.17 |

(Continued)

*Primary Examiner* — Justin M Benedik
(74) *Attorney, Agent, or Firm* — PG Scott Born; Foster Garvey PC

(57) ABSTRACT

An ejector system for propelling a vehicle. The system includes a diffusing structure and a duct coupled to the diffusing structure. The duct includes a wall having openings formed therethrough and configured to introduce to the diffusing structure a primary fluid produced by the vehicle. An airfoil is positioned within the flow of the primary fluid through the openings to the diffusing structure.

14 Claims, 4 Drawing Sheets

(56) References Cited

U.S. PATENT DOCUMENTS

| | | | | |
|---|---|---|---|---|
| 4,516,907 A | * | 5/1985 | Edwards | F03D 1/04 |
| | | | | 415/4.5 |
| 2013/0336781 A1 | * | 12/2013 | Rolt | B64C 9/16 |
| | | | | 415/208.1 |
| 2014/0373546 A1 | * | 12/2014 | Ammon | B01F 5/049 |
| | | | | 60/689 |
| 2017/0060140 A1 | * | 3/2017 | Harrison | B64C 9/38 |

* cited by examiner

WINGLET EJECTOR CONFIGURATIONS

PRIORITY CLAIM

This application is a continuation of U.S. patent application Ser. No. 15/625,907 filed Jun. 16, 2017; which is a continuation-in-part of U.S. patent application Ser. No. 15/221,389 filed Jul. 27, 2016, which claims priority to U.S. Provisional Application No. 62/213,465 filed Sep. 2, 2015, the entire disclosures of each of the foregoing of which are hereby incorporated by reference as if fully set forth herein.

COPYRIGHT NOTICE

This disclosure is protected under United States and International Copyright Laws.© 2017-2020 Jetoptera. All rights reserved. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND

Aircrafts that can hover, take off and land vertically are commonly referred to as Vertical Take-Off and Landing (VTOL) aircrafts. This classification includes fixed-wing aircrafts as well as helicopters and aircraft with tilt-able powered rotors. Some VTOL aircrafts can operate in other modes as well, such as Short Take-Off and Landing (STOL). VTOL is a subset of V/STOL (Vertical and/or Short Take-off and Landing).

For illustrative purposes, an example of a current aircraft that has VTOL capability is the F-35 Lightning. Conventional methods of vectoring the vertical lift airflow includes the use of nozzles that can be swiveled in a single direction along with the use of two sets of flat flapper vanes arranged 90 degrees to each other and located at the external nozzle. The propulsion system of the F-35 Lightning, similarly, provides vertical lifting force using a combination of vectored thrust from the turbine engine and a vertically oriented lift fan. The lift fan is located behind the cockpit in a bay with upper and lower clamshell doors. The engine exhausts through a three-bearing swivel nozzle that can deflect the thrust from horizontal to just forward of vertical. Roll control ducts extend out in each wing and are supplied with their thrust with air from the engine fan. Pitch control is affected via lift fan/engine thrust split. Yaw control is through yaw motion of the engine swivel nozzle. Roll control is provided by differentially opening and closing the apertures at the ends of the two roll control ducts. The lift fan has a telescoping "D"-shaped nozzle to provide thrust deflection in the forward and aft directions. The D-nozzle has fixed vanes at the exit aperture.

The design of an aircraft or drone more generally consists of its propulsive elements and the airframe into which those elements are integrated. Conventionally, the propulsive device in aircrafts can be a turbojet, turbofan, turboprop or turboshaft, piston engine, or an electric motor equipped with a propeller. The propulsive system (propulsor) in small unmanned aerial vehicles (UAVs) is conventionally a piston engine or an electric motor which provides power via a shaft to one or several propellers. The propulsor for a larger aircraft, whether manned or unmanned, is traditionally a jet engine or a turboprop. The propulsor is generally attached to the fuselage or the body or the wings of the aircraft via pylons or struts capable of transmitting the force to the aircraft and sustaining the loads. The emerging mixed jet (jet efflux) of air and gases is what propels the aircraft in the opposite direction to the flow of the jet efflux.

Conventionally, the air stream efflux of a large propeller is not used for lift purposes in level flight and a significant amount of kinetic energy is hence not utilized to the benefit of the aircraft, unless it is swiveled as in some of the applications existing today (namely the Bell Boeing V-22 Osprey). Rather, the lift on most existing aircrafts is created by the wings and tail. Moreover, even in those particular VTOL applications (e.g., take-off through the transition to level flight) found in the Osprey, the lift caused by the propeller itself is minimal during level flight, and most of the lift force is nonetheless from the wings.

The current state of art for creating lift on an aircraft is to generate a high-speed airflow over the wing and wing elements, which are generally airfoils. Airfoils are characterized by a chord line extended mainly in the axial direction, from a leading edge to a trailing edge of the airfoil. Based on the angle of attack formed between the incident airflow and the chord line, and according to the principles of airfoil lift generation, lower pressure air is flowing over the suction (upper) side and conversely, by Bernoulli law, moving at higher speeds than the lower side (pressure side). The lower the airspeed of the aircraft, the lower the lift force, and higher surface area of the wing or higher angles of incidence are required, including for take-off.

Large UAVs make no exception to this rule. Lift is generated by designing a wing airfoil with the appropriate angle of attack, chord, wingspan, and camber line. Flaps, slots and many other devices are other conventional tools used to maximize the lift via an increase of lift coefficient and surface area of the wing, but it will be generating the lift corresponding to at the air-speed of the aircraft. (Increasing the area (S) and lift coefficient ($C_L$) allow a similar amount of lift to be generated at a lower aircraft airspeed (V0) according to the formula $L=\frac{1}{2}\rho V^2 SC_L$, but at the cost of higher drag and weight.) These current techniques also perform poorly with a significant drop in efficiency under conditions with high cross winds.

While smaller UAVs arguably use the thrust generated by propellers to lift the vehicle, the current technology strictly relies on control of the electric motor speeds, and the smaller UAV may or may not have the capability to swivel the motors to generate thrust and lift, or transition to a level flight by tilting the propellers. Furthermore, the smaller UAVs using these propulsion elements suffer from inefficiencies related to batteries, power density, and large propellers, which may be efficient in hovering but inefficient in level flight and create difficulties and danger when operating due to the fast-moving tip of the blades. Most current quadcopters and other electrically powered aerial vehicles are only capable of very short periods of flight and cannot efficiently lift or carry large payloads, as the weight of the electric motor system and battery is already well exceeding 70% of the weight of the vehicle. A similar vehicle using jet fuel or any other hydrocarbon fuel typically used in transportation will carry more usable fuel by at least one order of magnitude. This can be explained by the much higher energy density of the hydrocarbon fuel compared to battery systems (by at least one order of magnitude), as well as the lower weight to total vehicle weight ratio of a hydrocarbon fuel based system.

Accordingly, there is a need for enhanced efficiency, improved capabilities, and other technological advancements in aircrafts, particularly to UAVs and certain manned aerial vehicles.

BRIEF DESCRIPTION OF THE DRAWING FIGURES

DETAILED DESCRIPTION

This application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms. In addition, the headings in this application are for reference purposes only and shall not in any way affect the meaning or interpretation of the present invention.

One embodiment of the present invention includes a propulsor that utilizes fluidics for the entrainment and acceleration of ambient air and delivers a high-speed jet efflux of a mixture of the high-pressure gas (supplied to the propulsor from a gas generator) and entrained ambient air. In essence, this objective is achieved by discharging the gas adjacent to a convex surface. The convex surface is a so-called Coanda surface benefitting from the Coanda effect described in U.S. Pat. No. 2,052,869 issued to Henri Coanda on Sep. 1, 1936. In principle, the Coanda effect is the tendency of a jet-emitted gas or liquid to travel close to a wall contour even if the direction of curvature of the wall is away from the axis of the jet. The convex Coanda surfaces discussed herein with respect to one or more embodiments do not have to consist of any particular material.

Figure 1:
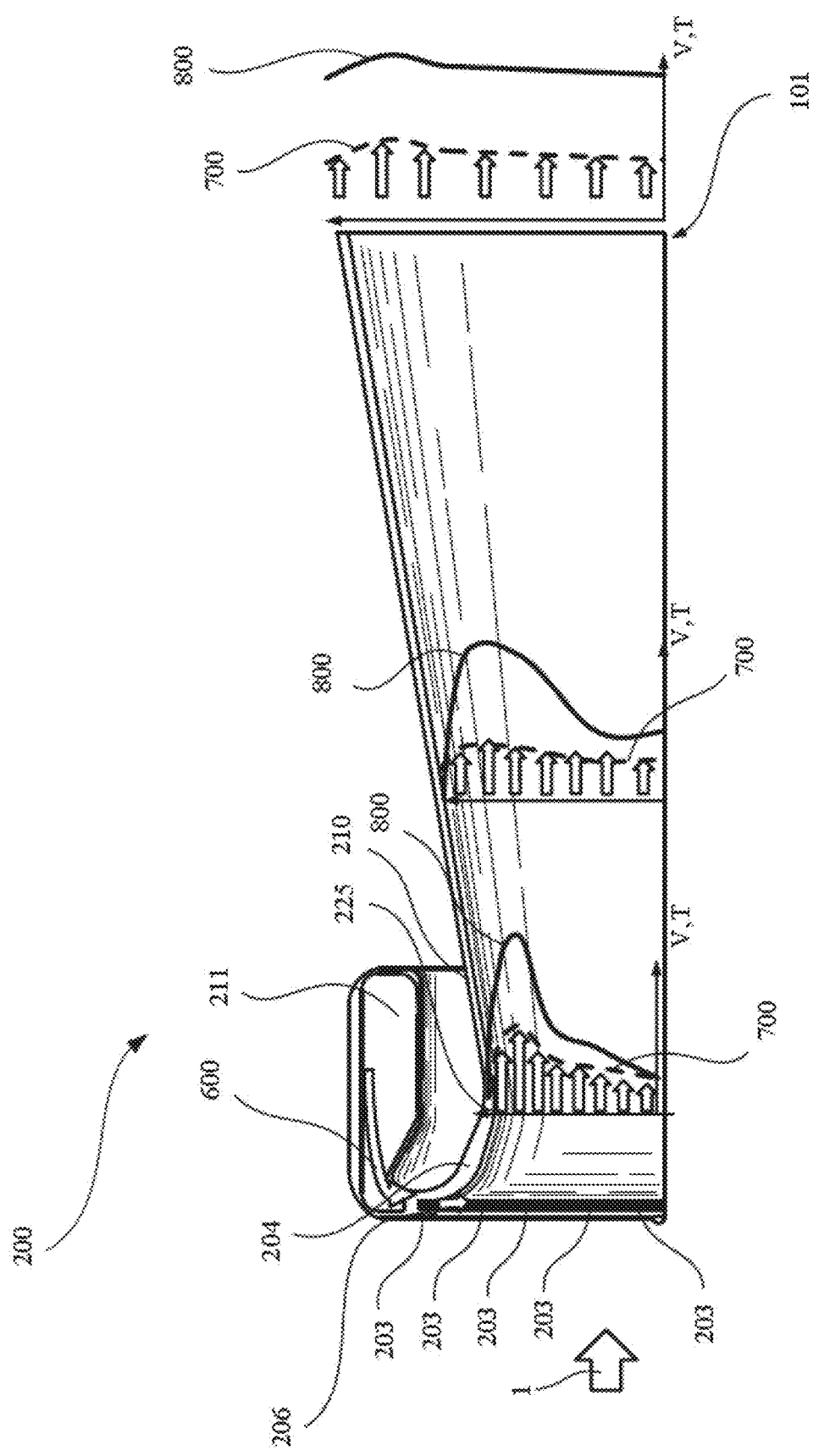
FIG. 1 is a cross-section of one embodiment of the present invention depicting the upper half of an ejector and profiles of velocity and temperature within the internal flow.

FIG. 1 illustrates a cross-section of the upper half of an ejector 200 that may be attached to a vehicle (not shown), such as, for non-limiting examples, a UAV or a manned aerial vehicle, such as an airplane. A duct, such as plenum 211, is supplied with hotter-than-ambient air (i.e., a pressurized motive gas stream) from, for example, a combustion-based engine that may be employed by the vehicle. This pressurized motive gas stream, denoted by arrow 600, is introduced via at least one conduit, such as primary nozzles 203, to the interior of the ejector 200. More specifically, the primary nozzles 203 are configured to accelerate the motive fluid stream 600 to a variable predetermined desired velocity directly over a convex Coanda surface 204 as a wall jet. Additionally, primary nozzles 203 provide adjustable volumes of fluid stream 600. This wall jet, in turn, serves to entrain through an intake structure 206 secondary fluid, such as ambient air denoted by arrow 1, that may be at rest or approaching the ejector 200 at non-zero speed from the direction indicated by arrow 1. In various embodiments, the nozzles 203 may be arranged in an array and in a curved orientation, a spiraled orientation, and/or a zigzagged orientation.

The mix of the stream 600 and the air 1 may be moving purely axially at a throat section 225 of the ejector 200. Through diffusion in a diffusing structure, such as diffuser 210, the mixing and smoothing out process continues so the profiles of temperature (800) and velocity (700) in the axial direction of ejector 200 no longer have the high and low values present at the throat section 225, but become more uniform at the terminal end 100 of diffuser 210. As the mixture of the stream 600 and the air 1 approaches the exit plane of terminal end 100, the temperature and velocity profiles are almost uniform. In particular, the temperature of the mixture is low enough to be directed towards an airfoil such as a wing or control surface.

Figure 2:
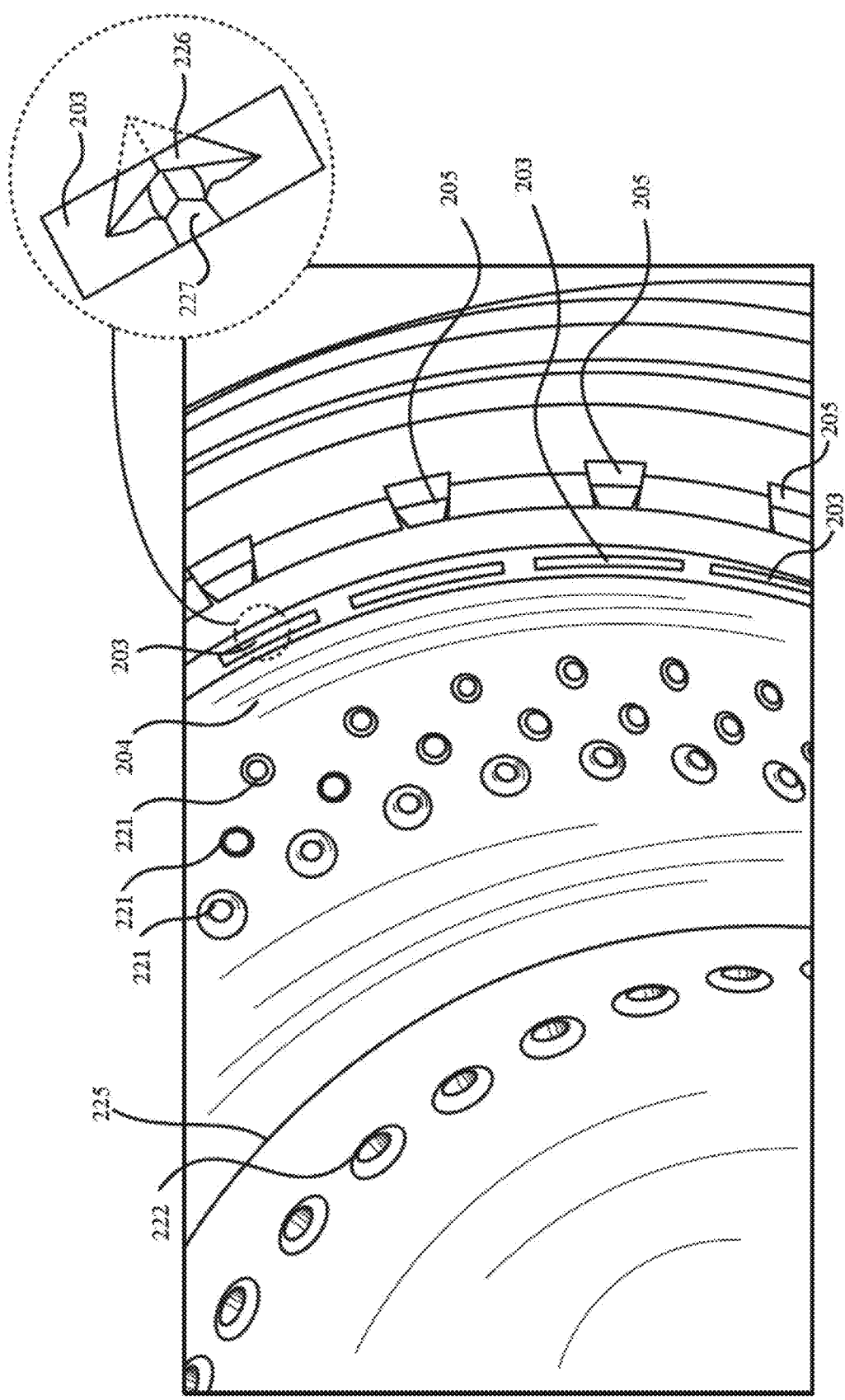
FIG. 2 illustrates features of surfaces of the ejector of FIG. 1 according to an embodiment.

In an embodiment, and as best illustrated in FIG. 2, V-shaped, vortex generating secondary nozzles 205 are staggered when compared to a normal rectangular primary nozzle 203 and injecting at least 25% of the total fluid stream 600 before the balance of the fluid stream massflow is injected at a moment later by nozzles 203. This injection by nozzles 205 prior to that of nozzles 203 results in a higher entrainment rate enough to significantly increase the performance of the ejector 200. Secondary nozzles 205 introduce a more-favorable entrainment of the secondary flow via shear layers and are staggered both axially and circumferentially in relation to the primary nozzles 203.

Primary nozzles 203 may include an airfoil, such as a delta-wing structure 226, that is provided with a supporting leg 227 connected to the middle point of the primary nozzle 203 structure at its innermost side, with a delta-wing structure apex pointing against the fluid stream 600 flow to maximize entrainment. This in turn generates two vortices opposed in direction towards the center of the delta wing 226 and strongly entraining from both sides of primary nozzle 203 the already entrained mixture of primary and secondary fluid flows resulting from nozzles 205. Supporting leg 227 may, in an embodiment, serve as an actuating element capable of causing structure 226 to vibrate.

Additionally, an embodiment improves the surface for flow separation delay via elements such as dimples 221 placed on the Coanda surface 204. The dimples 221 prevent separation of the flow and enhance the performance of the ejector 200 significantly. Additionally, surfaces of the diffuser 210 (see FIG. 1) may also include dimples 222 and/or other elements that delay or prevent separation of the boundary layer.

Other embodiments of the invention may employ structures different from delta wing 226 to enhance entrainment and the attachment of the flow produced through nozzles 203.

For example, one approach may employ thermophoresis in which a cold fluid is made available to cool off surface 204 where the separation propensity at high speeds is greater. By cooling off several regions of the surface 204, the hot motive fluid is diverted towards the cold portion of surface 204 through the force of thermophoresis. In one embodiment bleed air from the compressor discharge of a jet engine acting as a gas generator is routed towards an internal channel system (not shown) of ejector 200 that allows the cooling of hot spots where separation occurs. A typical difference in temperature goes from 100° F. uncooled to 500° F. (hot stream temperature of a nozzle 203 is 1200 and wall temperature is brought down to 700° F.).

Another approach may employ electrophoresis in which elements (not shown) embedded into surface 204 generate a local field that enhances fluid attachment and delays or eliminates separation. The current source for such elements can be provided by a battery or a generator coupled with the main gas generator of the vehicle.

Another approach may employ plasma in a manner similar to electrophoresis as in the use of electric fields, albeit in this case acting at high altitudes where plasma generation is less energy-intensive. Specially placed elements (not shown) may enhance attachment and eliminate separation.

Yet another approach may mechanically reduce or enlarge the height of the nozzles 203. By reducing the wall height, it is possible to increase local velocity. Such may be achieved by curving the inlet portion of the individual channels where the hot flow is guided from the plenum to the nozzles 203 and manipulating the flow in that manner.

Figure 3:
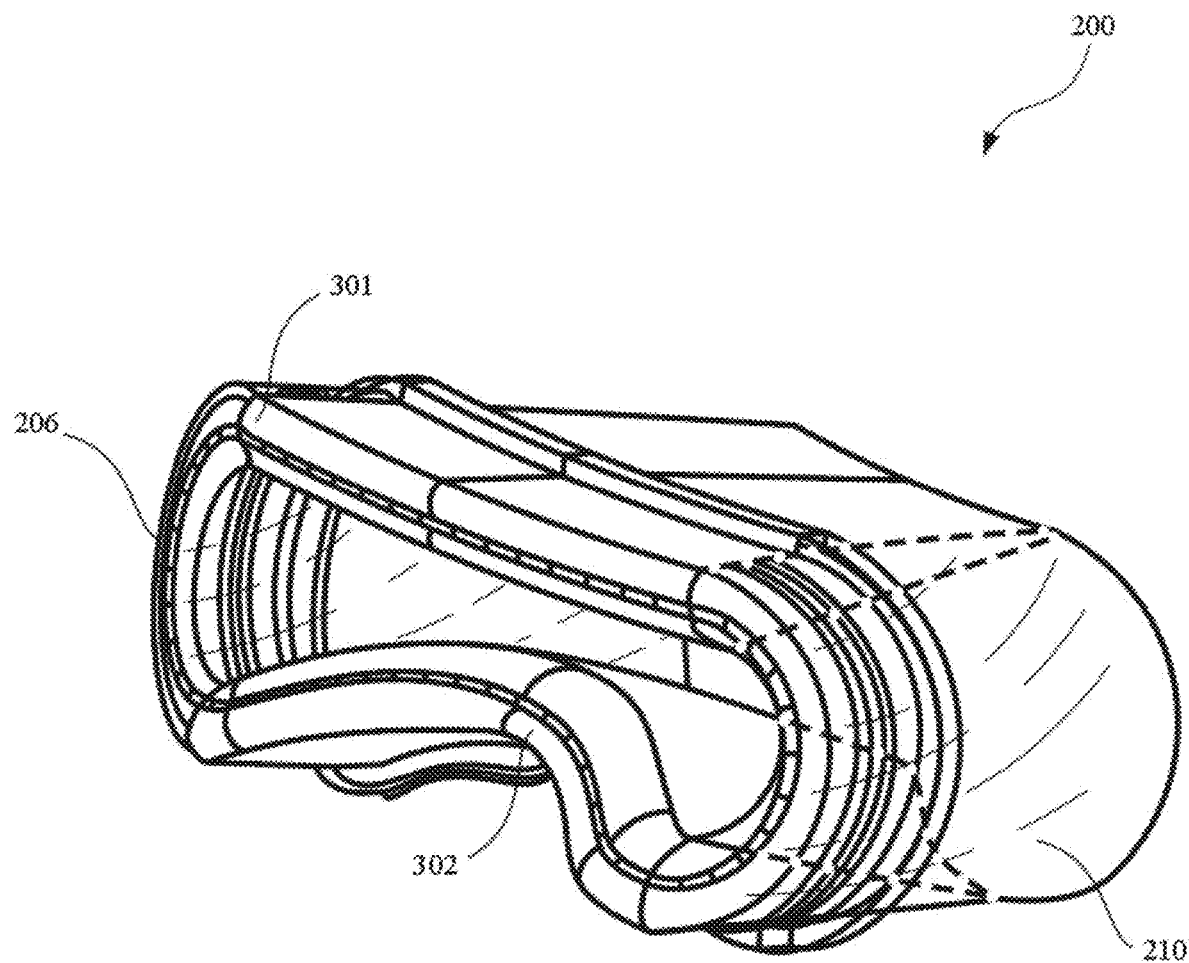
FIGS. 3-4 illustrate partial perspective views of intake structures according to one or more embodiments.
Figure 4:
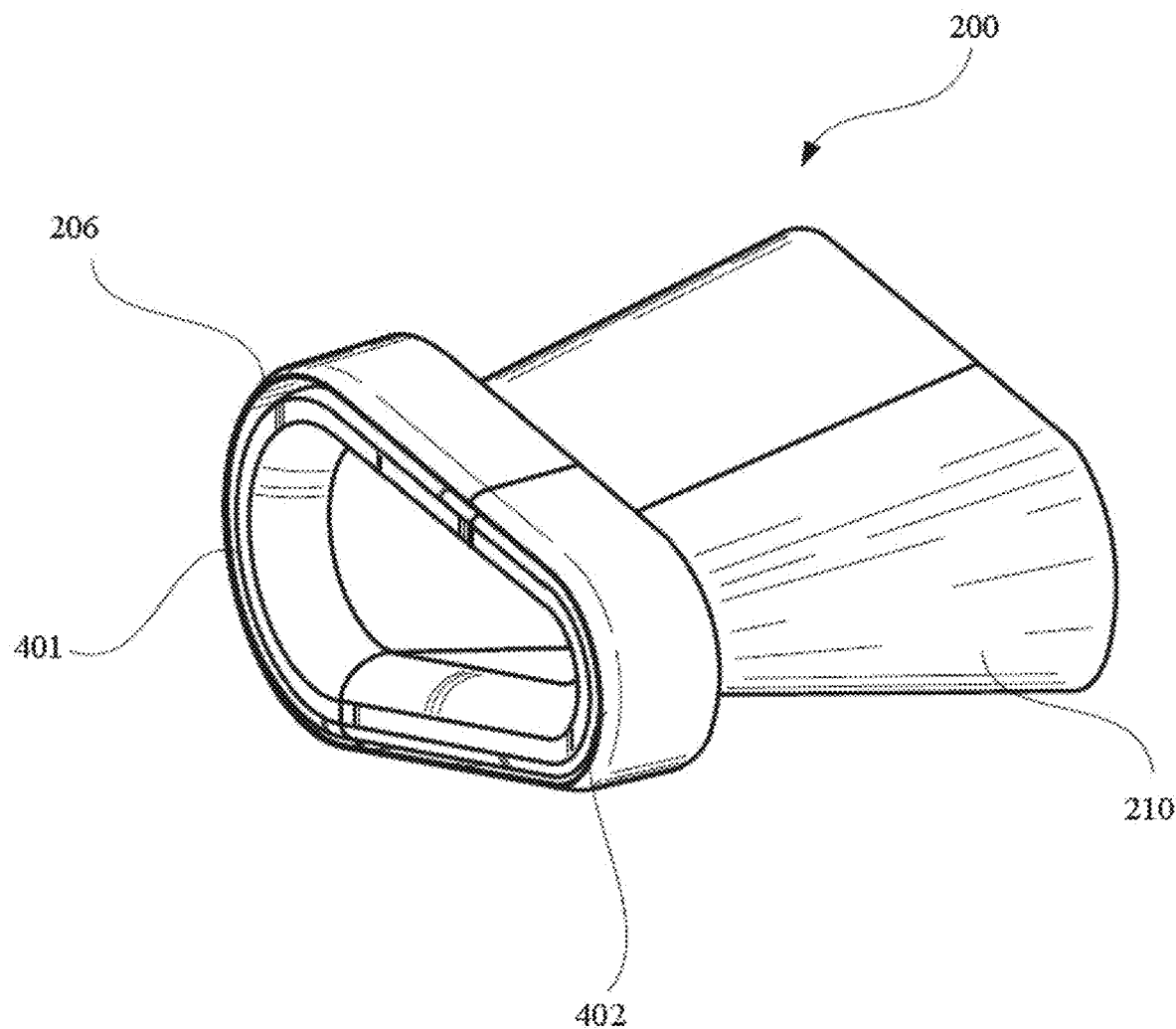

In an embodiment, intake structure 206 may be circular in configuration. However, in varying embodiments, and as best shown in FIGS. 3-4, intake structure 206 can be non-circular and, indeed, asymmetrical (i.e., not identical on both sides of at least one, or alternatively any-given, plane bisecting the intake structure). For example, as shown in FIG. 3, the intake structure 206 can include first and second opposing edges 301, 302, wherein the second opposing edge includes a curved portion projecting toward the first opposing edge. As shown in FIG. 4, the intake structure 206 can include first and second lateral opposing edges 401, 402, wherein the first lateral opposing edge has a greater radius of curvature than the second lateral opposing edge.

Although the foregoing text sets forth a detailed description of numerous different embodiments, it should be understood that the scope of protection is defined by the words of the claims to follow. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:

1. An ejector system for propelling a vehicle, the system comprising:
   a diffusing structure;
   a duct coupled to the diffusing structure, the duct comprising a wall having openings formed therethrough, the openings configured to introduce to the diffusing structure a primary fluid produced by the vehicle; and
   one or more airfoils coupled to the wall and positioned within the flow of the primary fluid through the openings.

2. The system of claim 1, further comprising an intake structure coupled to the diffusing structure and configured to introduce to the diffusing structure a secondary fluid accessible to the vehicle, wherein the diffusing structure comprises an outlet structure out of which propulsive fluid flows at a predetermined adjustable velocity, and the propulsive fluid comprises the primary and secondary fluids.

3. The system of claim 1, wherein the ejector further comprises a convex surface, the diffusing structure is coupled to the convex surface, and the duct is coupled to the convex surface and configured to introduce the primary fluid through the openings to the convex surface.

4. The system of claim 1, wherein the one or more airfoils are triangular.

5. The system of claim 3, wherein the convex surface includes a plurality of recesses.

6. The system of claim 1, further comprising an actuating element coupled to the one or more airfoils and configured to cause the one or more airfoils to vibrate.

7. The system of claim 2, wherein the intake structure is asymmetrical.

8. A vehicle, comprising:
   a main body;
   a gas generator coupled to the main body and producing a gas stream;
   a diffusing structure coupled to the main body;
   a duct coupled to the gas generator, the duct comprising a wall having openings formed therethrough, the openings configured to introduce to the diffusing structure the gas stream; and
   one or more airfoils positioned within the flow of the gas stream through the openings.

9. The vehicle of claim 8, further comprising an intake structure coupled to the diffusing structure and configured to introduce to the diffusing structure a secondary fluid accessible to the vehicle, wherein the diffusing structure comprises an outlet structure out of which propulsive fluid flows at a predetermined adjustable velocity, and the propulsive fluid comprises the gas stream and secondary fluid.

10. The vehicle of claim 8, wherein the ejector further comprises a convex surface, the diffusing structure is coupled to the convex surface, and the duct is coupled to the convex surface and configured to introduce the gas stream through the openings to the convex surface.

11. The vehicle of claim 8, wherein the one or more airfoils are triangular.

12. The vehicle of claim 10, wherein the convex surface includes a plurality of recesses.

13. The vehicle of claim 8, further comprising an actuating element coupled to the one or more airfoils and configured to cause the one or more airfoils to vibrate.

14. The vehicle of claim 9, wherein the intake structure is asymmetrical.

* * * * *